United States Patent
Ogawa et al.

(10) Patent No.: US 9,087,523 B2
(45) Date of Patent: Jul. 21, 2015

(54) INFORMATION RECORDING MEDIUM, INFORMATION REPRODUCING APPARATUS, MANAGEMENT INFORMATION REPRODUCING METHOD, INFORMATION RECORDING/REPRODUCING APPARATUS AND IDENTIFICATION INFORMATION REPRODUCING/RECORDING METHOD

(71) Applicant: Kabushiki Kaisha Toshiba, Minato-ku (JP)

(72) Inventors: Akihito Ogawa, Fujisawa (JP); Kazuo Watabe, Yokohama (JP); Hideaki Okano, Yokohama (JP); Takashi Usui, Saitami (JP); Hidefumi Takamine, Tokyo (JP); Kazuaki Doi, Kawasaki (JP); Masahiro Saito, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/201,330

(22) Filed: Mar. 7, 2014

(65) Prior Publication Data
US 2014/0185420 A1 Jul. 3, 2014

Related U.S. Application Data

(63) Continuation of application No. PCT/JP2011/070605, filed on Sep. 9, 2011.

(51) Int. Cl.
*G11B 7/24038* (2013.01)
*G11B 7/007* (2006.01)
(Continued)

(52) U.S. Cl.
CPC ........ *G11B 7/00736* (2013.01); *G11B 7/24038* (2013.01); *G11B 7/24094* (2013.01); *G11B 7/2405* (2013.01)

(58) Field of Classification Search
CPC ............ G11B 7/2403; G11B 7/24035; G11B 7/24038; G11B 7/2407; G11B 7/24094; G11B 2007/0013; G11B 2020/1265; G11B 7/00736; G11B 20/00268
USPC .................. 369/94, 283, 59.25, 272.1, 275.3, 369/44.11, 53.28, 53.34, 44.26
See application file for complete search history.

(56) References Cited

U.S. PATENT DOCUMENTS 6,738,322 B2 * 5/2004 Amble et al. ............... 369/44.27
7,706,233 B2 * 4/2010 Horimai et al. ............... 369/103
(Continued)

FOREIGN PATENT DOCUMENTS

JP 2001-256655 A 9/2001
JP 2001-357542 A 12/2001
(Continued)

OTHER PUBLICATIONS

International Preliminary Report on Patentability and Written Opinion issued Mar. 20, 2014 in PCT/JP2011/070605 (submitting English translation only).

(Continued)

*Primary Examiner* — Thomas Alunkal
(74) *Attorney, Agent, or Firm* — Oblon, McClelland, Maier & Neustadt, L.L.P.

(57) ABSTRACT

According to one embodiment, in an information recording medium including a plurality of data layers, at least one pre-format area is provided on each of the data layers and is circumferentially divided into a plurality of segments. Management information including data layer identification information for identifying the data layers is recorded in at least one of the segments in each of the data layers, using the marks include BCA marks extending radially uniformly. On adjacent ones of the data layers, the BCA marks associated with the management information are recorded in differently positioned segments which are not opposed to each other.

12 Claims, 17 Drawing Sheets

(51) Int. Cl.
  *G11B 7/24094* (2013.01)
  *G11B 7/2405* (2013.01)

(56) References Cited

U.S. PATENT DOCUMENTS

| | | | |
|---|---|---|---|
| 8,238,215 B2 * | 8/2012 | Nakatani et al. | 369/94 |
| 8,279,723 B2 * | 10/2012 | Nakatani et al. | 369/44.14 |
| 8,427,932 B2 * | 4/2013 | Inoue et al. | 369/278 |
| 2001/0007545 A1 | 7/2001 | Ueda et al. | |
| 2001/0053118 A1 * | 12/2001 | Yoshinari et al. | 369/275.2 |
| 2005/0099916 A1 | 5/2005 | Jeon et al. | |
| 2007/0104059 A1 | 5/2007 | Nakatani et al. | |
| 2008/0013441 A1 * | 1/2008 | Oouchida | 369/275.4 |
| 2008/0165652 A1 * | 7/2008 | Misawa et al. | 369/94 |
| 2008/0239919 A1 * | 10/2008 | Maruyama | 369/94 |
| 2009/0046558 A1 * | 2/2009 | Ohkubo | 369/100 |
| 2009/0116360 A1 * | 5/2009 | Matsumura et al. | 369/94 |
| 2011/0205882 A1 * | 8/2011 | Hirata et al. | 369/283 |
| 2013/0094343 A1 | 4/2013 | Ogawa et al. | |

FOREIGN PATENT DOCUMENTS

| | | |
|---|---|---|
| JP | 2002-50053 A | 2/2002 |
| JP | 2002-117585 A | 4/2002 |
| JP | 2005-122862 A | 5/2005 |
| JP | 2005-536823 A | 12/2005 |
| JP | 2007-133953 A | 5/2007 |
| JP | 2007-257759 A | 10/2007 |
| JP | 2008-21348 A | 1/2008 |
| JP | 2008-130126 A | 6/2008 |
| JP | 2008-243299 A | 10/2008 |
| JP | 2009-140552 A | 6/2009 |
| JP | 2011-170935 A | 9/2011 |
| WO | 2012/063326 A1 | 5/2012 |

OTHER PUBLICATIONS

International Search Report issued on Oct. 18, 2011 for PCT/JP2011/070605 filed on Sep. 9, 2011 with English Translation.

International Written Opinion mailed on Oct. 18, 2011 for PCT/JP2011/070605 filed on Sep. 9, 2011.

Japanese Office Action issued Jul. 29, 2014 in Patent Application No. 2013-532377 with English Translation.

* cited by examiner

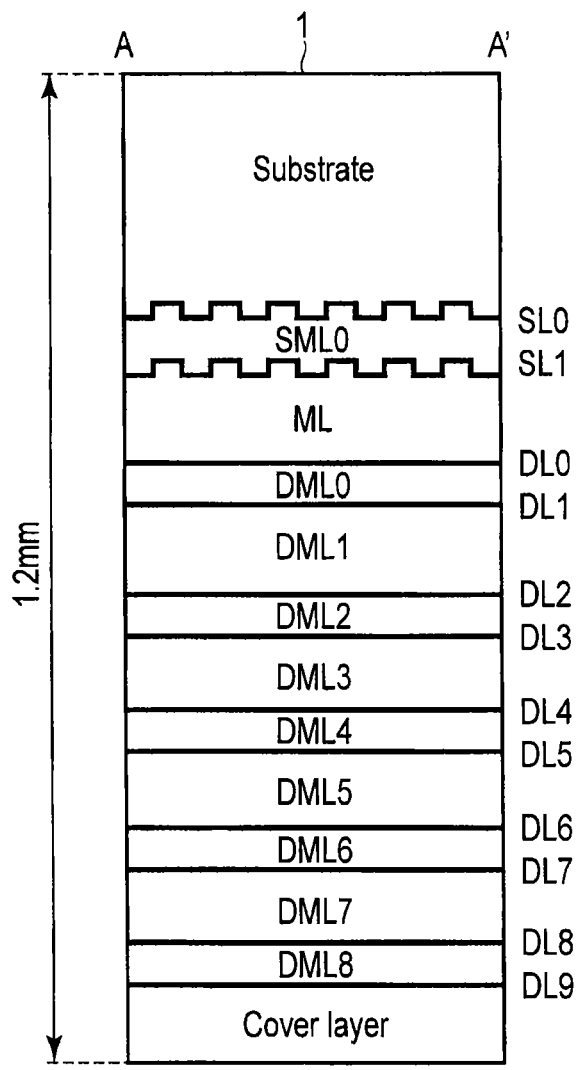
F I G. 2

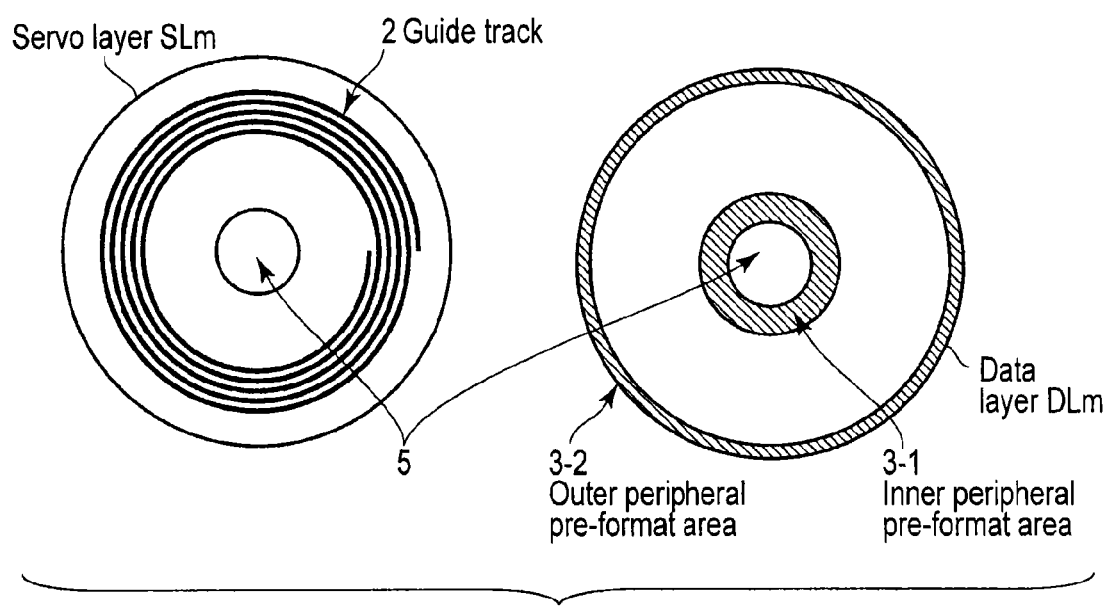
F I G. 3

| Layer number | Segment number |
|---|---|
| 0 | 1 |
| 1 | 3 |
| 2 | 5 |
| 3 | 2 |
| 4 | 4 |
| 5 | 1 |
| 6 | 3 |
| 7 | 5 |
| 8 | 2 |
| 9 | 4 |

| Layer number | Segment number |
|---|---|
| 0 | 1 |
| 1 | 3 |
| 2 | 5 |
| 3 | 2 |
| 4 | 4 |
| 5 | 6 |
| 6 | 8 |
| 7 | 10 |
| 8 | 7 |
| 9 | 9 |

F I G. 6

| Layer number | Inner/outer peripheral flag | Segment number |
|---|---|---|
| 0 | 0 | 1 |
| 1 | 0 | 3 |
| 2 | 0 | 5 |
| 3 | 0 | 2 |
| 4 | 0 | 4 |
| 5 | 1 | 1 |
| 6 | 1 | 3 |
| 7 | 1 | 5 |
| 8 | 1 | 2 |
| 9 | 1 | 4 |

F I G. 7

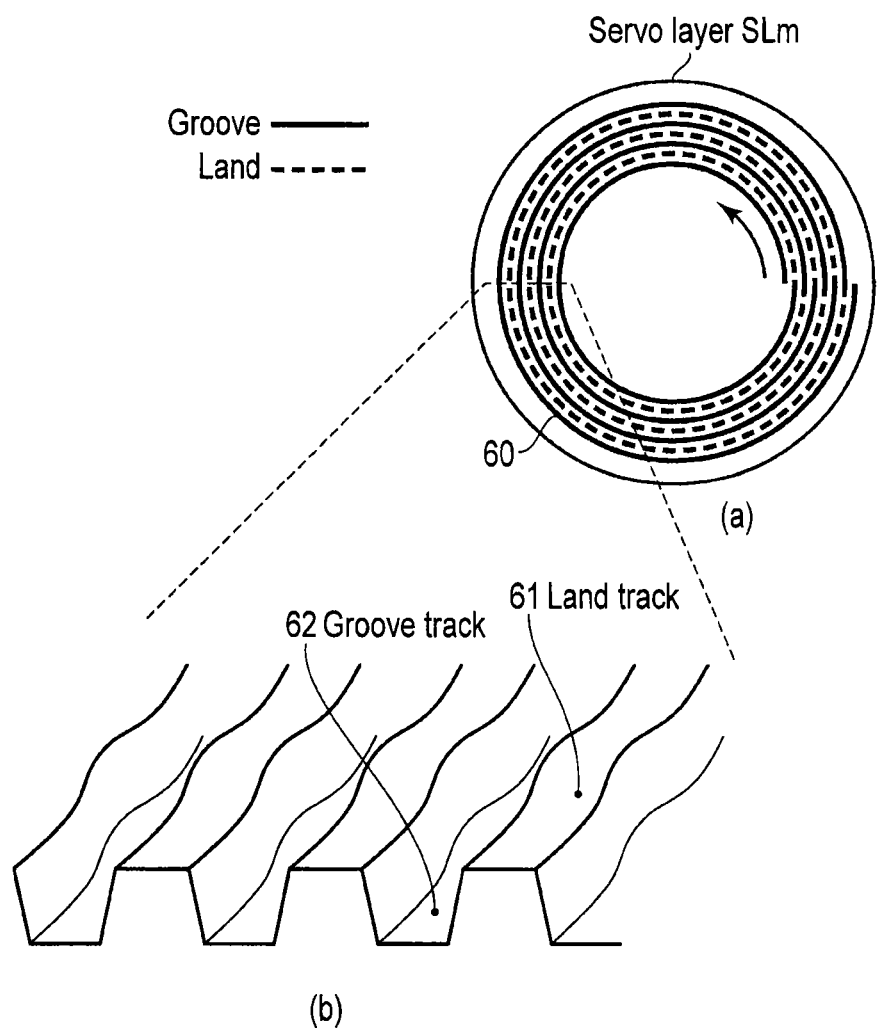
F I G. 10

|  | 3 bit | 1 bit | 7 bit | 6 bit | 1 bit | 12 bits | 12 bits | 12 bits |
|---|---|---|---|---|---|---|---|---|
| Land | Segment information | Layer address | Segment address | Zone address | Parity | Buffer | Land track address | Buffer |
| Groove | Segment information | Layer address | Segment address | Zone address | Parity | Groove track address | Buffer | Disk information |

F I G. 12

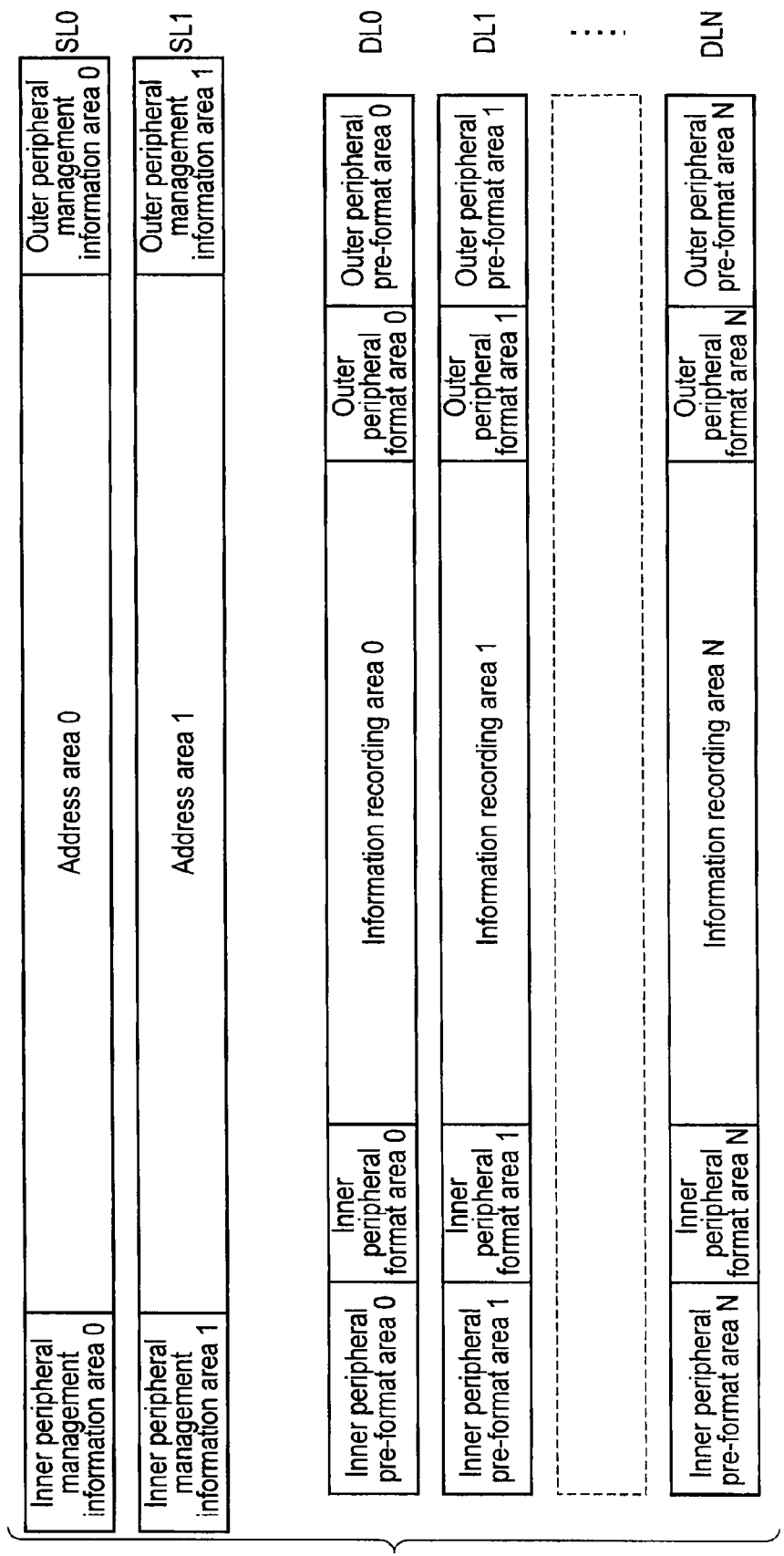
F I G. 14

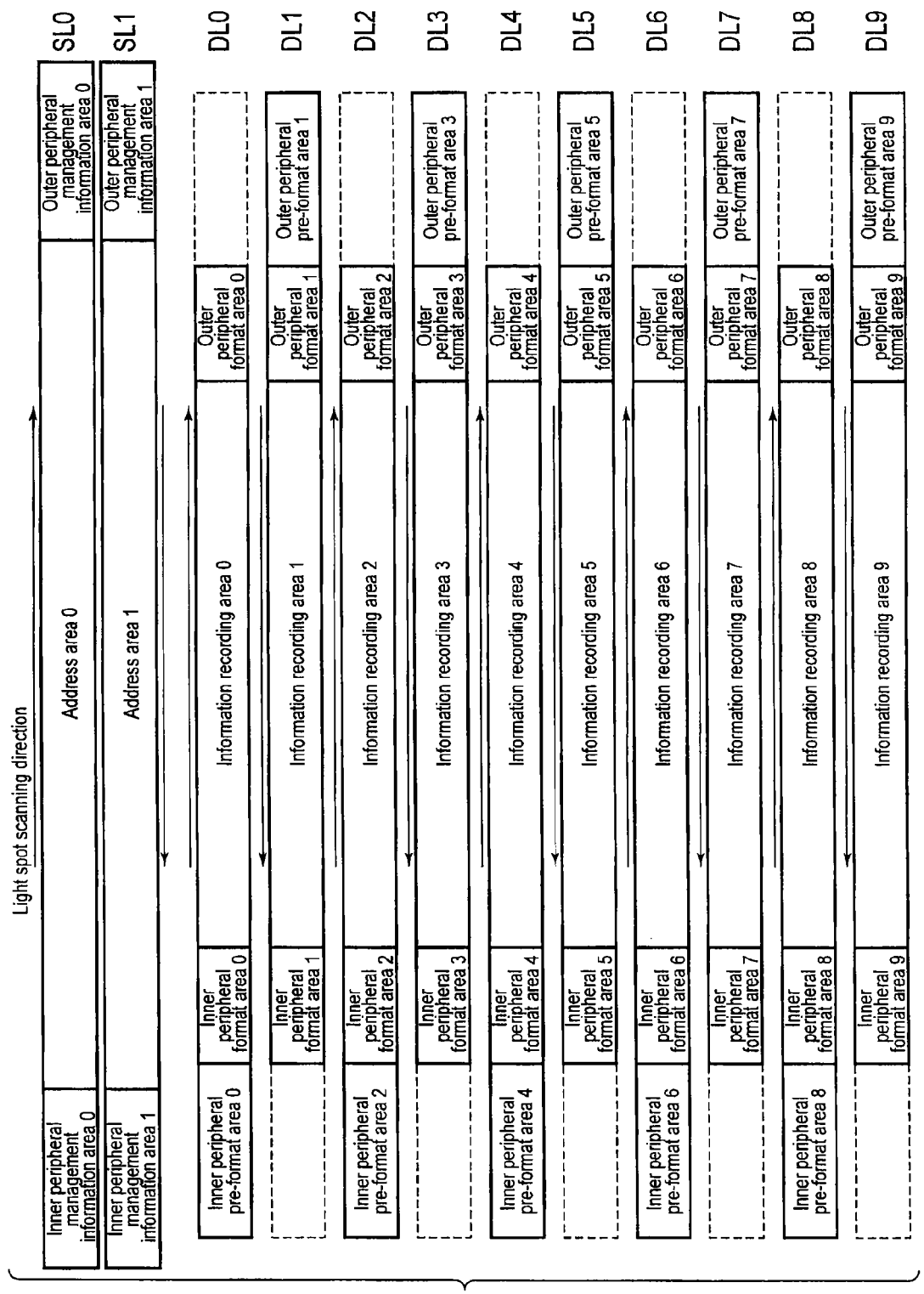
F I G. 15

|  | Content |
|---|---|
| BCA information | Format type |
|  | Layer number |
|  | Information area arrangement information |
|  | Reproducing power information, recording power information, recording pulse width information |
|  | Backup area |

F I G. 20

|  | Content |
|---|---|
| Disk management information | Format type |
|  | Disk size and transfer rate |
|  | Disk structure (number of servo layers, number of data layers), recording density |
|  | BCA information arrangement information |
|  | Information area arrangement information |
|  | Encryption key information |
|  | Reproducing power information, recording power information, recording pulse information |
|  | Backup area |

F I G. 21

|  | Content |
|---|---|
| Record management information | Format type |
|  | Layer number |
|  | User record information recorded position |
|  | Drive information |
|  | Learned recording power information and recording pulse width information |
|  | Defect management information |
|  | Backup area |

F I G. 22

INFORMATION RECORDING MEDIUM, INFORMATION REPRODUCING APPARATUS, MANAGEMENT INFORMATION REPRODUCING METHOD, INFORMATION RECORDING/REPRODUCING APPARATUS AND IDENTIFICATION INFORMATION REPRODUCING/RECORDING METHOD

CROSS REFERENCE TO RELATED APPLICATIONS

This application is a Continuation Application of PCT Application No. PCT/JP2011/070605, filed Sep. 9, 2011, the entire contents of which are incorporated herein by reference.

FIELD

Embodiments described herein relate generally to an information recording medium, an information reproducing apparatus, a management information reproducing method, an information recording/reproducing apparatus and an identification information reproducing/recording method.

BACKGROUND

To realize an information recording medium (such as an optical disk) of a great recording capacity, multi-layered (or ultra-multi-layered) information recording media with a large number of stacked data layers have recently been developed and put into practical use. On the other hand, reduction of productivity of information recording media caused by increase of data layers, in particular, degradation of production yield and increase of manufacturing tact time have become problematic. One of the processes that may cause the problems is a process of forming, in each layer of an information recording medium, a tracking servo layer and a spiral track groove (which will be also referred to simply as "groove") serving as a guide for address designation. For instance, in the case of an optical disk with ten layers, it is necessary to execute, in each layer, ten shape-forming steps using different stampers. This requires a process time, and even a single defective layer, if any, makes the disk itself defective.

In view of this, an information recording medium of a guide layer type, in which a plurality of data recording layers and a servo layer for tracking servo are provided separately, has been proposed. More specifically, a technique of providing one servo layer (SL) and four data layers (DL) in one optical disk has been proposed. In this technique, only the servo layer has a groove, and the data layers are formed flat. In the case of the information recording medium having the servo layer and the data layers separate from the former, it is sufficient if the shape-forming process is performed only on the servo layer. Therefore, this technique is advantageous in that even if the number of layers is increased to realize a large capacity, the number of shape forming steps does not increase.

However, in the information recording medium of the guide layer type, data for discriminating layer numbers cannot be beforehand recorded on the data layers because the data layers are formed so as not to have an uneven structure. Accordingly, at the time of recording/reproducing, it cannot be determined what number of data layer is currently being focused by a recording/reproducing beam.

As a method of recording information for control or management on an information recording medium after forming the information recording medium, a method utilizing BCA (Burst Cutting Area) information as in, for example, a DVD is already known. However, when the known method of recording BCA information is naively applied to an information recording medium of the guide layer type, significant leakage of signals between adjacent layers may well occur and significantly degrade BCA reproducing signals, which makes it difficult to record different BCA information items in a plurality of layers.

On the other hand, there is a technique of providing focus servo setting areas of different reflectance ratios along the radius of a disk. In this technique, it is possible to enhance the probability of success of a shifting operation to a desired focus position. However, since there is no means for determining, after the completion of the setting operation, what number of data layer in the data layers is the actually focused data layer, it cannot accurately be determined whether the focus servo setting operation has succeeded.

BRIEF DESCRIPTION OF THE DRAWINGS

FIG. 2 is a cross-sectional view of the information recording medium of the embodiment;

FIG. 3 is a structure view showing an example of a servo layer and an example of a data layer;

FIG. 6 is another example of the table showing the relationship between the layer number and the segment number;

FIG. 7 is an example of a table showing the relationship between the layer number, the inner/outer peripheral flag and the segment number;

FIG. 10 is a view for explaining a physical structure example of a track;

FIG. 12 is a table for explaining an example of a bit allocation associated with address management data;

FIG. 14 is a view showing a layout example of servo layers and data layers;

FIG. 15 is a view showing another layout example of servo layers and data layers;

FIG. 20 shows an example of BCA information;

FIG. 21 shows an example of management information; and

FIG. 22 shows an example of record management information.

DETAILED DESCRIPTION

An information recording medium and an information recording/reproducing apparatus according to an embodiment of the invention will be described in detail with reference to the accompanying drawings.

In general, according to one embodiment, there is provided an information recording medium for optically storing data, which has a radial direction. The information recording medium comprises a plurality of stacked data layers each having pre-format areas which are circumferentially divided into a plurality of segments, the segments on one of the data layers being opposed to the segments on adjacent one of the data layers. The management information includes identification information for identifying the data layers and is recorded as a sequence of marks in at least one of the segments in each of the data layers. The marks are uniformly extended in a radial direction of the recording medium, and the sequences of marks on the adjacent ones of the data layers are separately allocated to the segments which are not opposed to each other on the adjacent ones of the data layers. At least one servo layer storing segment address information for specifying the segments on which the sequence of marks are allocated.

(Information Recording/Reproducing Medium)

Figure 1:
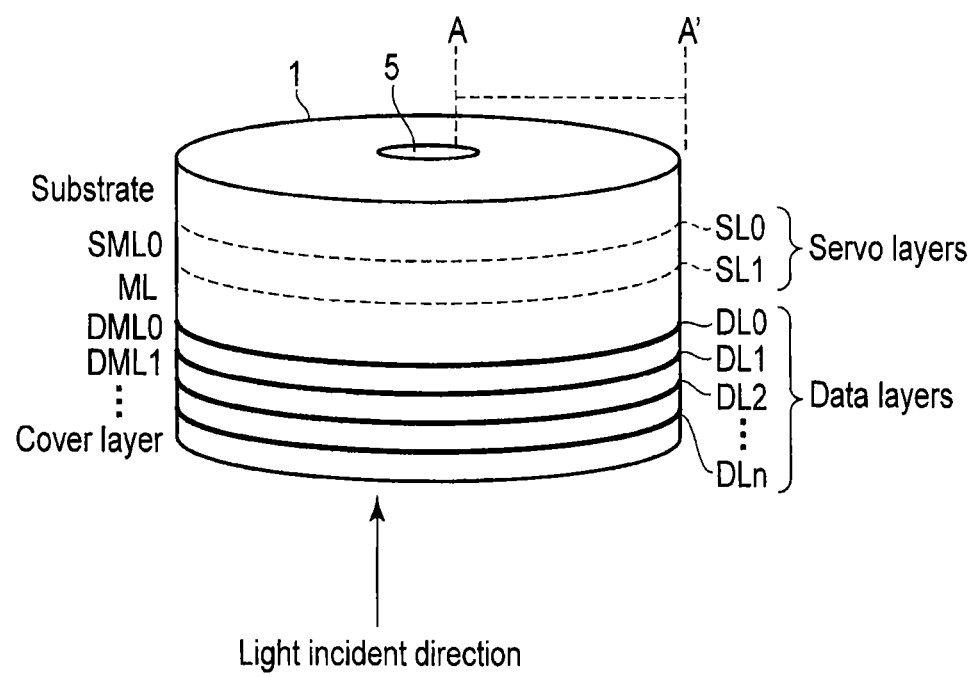
FIG. 1 is a schematic view showing an example of an information recording medium according to an embodiment.

FIGS. 1 and 2 show a structure example of an information recording medium according to the embodiment.

FIG. 1 shows an appearance example of the information recording medium 1. The information recording medium 1 is of a disk shape, and has a hole 5 formed for clamping at its center. The medium 1 has a layered structure. In the example of FIG. 1, the medium incorporates two servo layers and a plurality (n+1) of data layers. The data layers are arranged on the front side and the servo layers are arranged on the rear side, when viewed from the light incidence direction.

FIG. 2 is a cross-sectional view taken along line A-A' and showing the medium 1 (n=9). When viewed from the light incidence direction, there are provided, from the rear side, a disk substrate, a servo layer #0 (SL0), an intermediate layer #0 (SML0) between the servo layers, a servo layer #1 (SL1), an intermediate layer (ML) between the servo layers and the data layers, a data layer #0 (DL0), an intermediate layer #0 (DML0) between data layers #0 and #1 (DL0 and DL1), a data layer #1 (DL1), . . . , a data layer #9 (DL9) and a cover layer, in the order mentioned.

The overall medium 1 has a thickness of, for example, 1.2 mm, and the substrate has a thickness of, for example, approx. 0.8 mm. The thickness of SML0 is set in consideration of the wavelength (e.g., 605 nm) of a laser beam for reading the servo layer. The thickness of SML0 is, for example, 55 μm. The thickness of the intermediate layer ML is, for example, 126 μm.

The intermediate layers of the data layers have different thicknesses. For instance, when there are provided relatively thin layers of a first type and relatively thick layers of a second type, the intermediate layers having even numbers (DML0, DML2, . . . , DML8) are formed to a first thickness (e.g., about 12 μm), and the intermediate layers having odd numbers (DML1, DML3, . . . DML9) are formed to a second thickness (e.g., about 16 μm). The thicknesses are set such that the adjacent intermediate layers have different thicknesses for the purpose of preventing the light reflected from the reverse surface of a non-reproducing layer from concentrating on a reproducing layer, i.e., of minimizing the influence of multiple reflection. Further, if the number of the intermediate layers with odd numbers is greater than that of the intermediate layers with even numbers (or vice versa), the odd-number layers are formed thinner than the even-number layers (or vice versa), thereby minimizing the overall thickness to suppress the optical aberration that will occur when data is reproduced from a target layer remoter from the incident side.

The cover layer has a thickness of, for example, 50 μm.

The thickness of each layer is determined based on the wavelength of a laser beam to be focused on the servo layer or the data layer, respectively. Since a laser beam of a long wavelength is applied to the servo layers, it is preferable to make the intermediate layer (SML0) between the servo layer thicker than each intermediate layer (DML0, DML1, . . . , DML9) between the corresponding adjacent data layers, in order to reduce the interlayer crosstalk. Further, since no interlayer jumping of a concentrated spot occurs between the servo layer and the data layer, the intermediate layer (ML) is made thicker than that between the servo layers, thereby reducing crosstalk. The above three types of intermediate layers have a transmittance close to 100% for the servo laser beam and the data recording laser beam.

The servo layers are formed of, for example, a metal film with a thickness of submicron order. In particular, the servo layer #0 (SL0) is formed of a thin film dedicated for reading (reproduction) and having a semi-transmissive property in which part of the servo laser beam is reflected and the other part is transmitted. Further, the servo layers each have a track structure serving as a servo guide. The data layers are each formed of a multi-layered film containing a recording material capable of recording, reading or erasure of data using an information recording laser. The multi-layered film has properties of transmitting the servo laser beam, transmitting part of the data recording laser beam, and reflecting and absorbing part of the data recording laser beam.

The number of the servo layers of the information recording medium according to the embodiment is not limited to two, but may be one, or three or more. Further, the number (n+1) of the data layers can be set to an arbitrary number not less than 2. However, descriptions will now be made referring to the example shown in FIGS. 1 and 2, if not otherwise specified.

(Structure of Servo and Data Layers)

FIG. 3 shows structure examples of the servo and data layers. In FIG. 3, reference number 5 denotes a hole for clamping.

As shown in FIG. 3, a guide track 2 of a spiral shape is formed on the overall surface of a servo layer SLm. When two servo layers are employed, they are set to have opposite spirals. For instance, assuming that the spiral track of the servo layer SL0 shown in FIGS. 1 and 2 is formed clockwise as shown in FIG. 3, the spiral track of the servo layer SL1 is formed counterclockwise. The directions of the spirals of the layers may be opposite to those shown. However, the following description will be made based on the shown spiral directions, if not otherwise specified. The spiral track has a continuous groove (recess) structure. Further, when the disk is rotated, the groove finely vibrates radially (this vibration is also called "wobble"), and data, such as a track number and address data indicating a circumferential position, can be recorded by modulating the frequency and/or phase of the wobble. As another example, the track may be formed of a sequence of pits. In this case, data, such as address data, can be recorded by changing the length of each pit.

In contrast, each data layer DLn does not have such a structure as the above-mentioned track. Data, such as user data, is recorded in a desired data layer DLn based on the track of each servo layer.

Furthermore, in the embodiment, an inner-peripheral pre-format area 3-1 is provided in the inner peripheral portion of each data layer DLn, and an outer-peripheral pre-format area 3-2 is provided in the outer peripheral portion of each data layer DLn. Both the inner-peripheral pre-format area 3-1 and the outer-peripheral pre-format area 3-2 may be provided as shown in FIG. 3. Alternatively, only the inner-peripheral pre-format area 3-1 or the outer-peripheral pre-format area 3-2 may be provided. In the description below, the inner-peripheral pre-format area 3-1 and the outer-peripheral pre-format area 3-2 will also be referred to collectively as a pre-format area 3. As will be described in detail, management information, which includes identification information for identifying the data layer, is recorded in the pre-format area 3 of each data layer. The identification information of the data layer is, for example, number information (i.e., the layer number). Although in the following description, the identification information of the data layer is explained as a layer number, it is not limited to this.

In the embodiment, the information recording/reproducing apparatus can accurately determine the number of the data layer currently read by reading the management information recorded in the pre-format area 3 of the data layer. In the embodiment, BCA (Burst Cutting Area) code is utilized to record the management information onto the pre-format area 3. The management information recorded by BCA code and including the layer number is also called "BCA information."

(Explanation of Pre-Format Area)

Figures 4, 5:
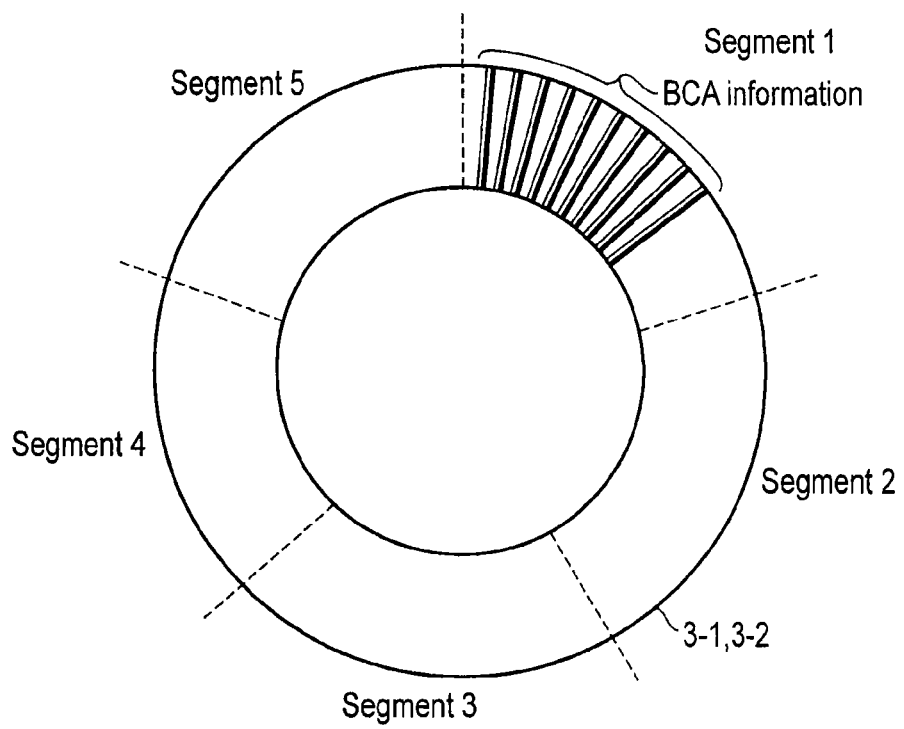
FIG. 4 is a structure view showing an example of a preformat area.
FIG. 5 is an example of a table showing the relationship between the layer number and the segment number.

FIG. 4 shows a structure example of the pre-format area 3. As shown in FIG. 4, each pre-format area 3 (the inner peripheral pre-format area 3-1 formed in the inner peripheral portion, and the outer peripheral pre-format area 3-2 formed in the outer peripheral portion) is divided into a plurality of circumferential regions (hereinafter referred to as "segments") (in FIG. 4, it is divided into five segments), each segment having identification information for identifying its position. This identification information is, for example, a segment number. Although the segment identification information will hereinafter be referred to as the segment number, it is not limited to the same.

In the embodiment, it is assumed that BCA information is recorded only in one segment beforehand selected from a plurality of segments in each pre-format area 3 of each data layer. It is also assumed that each pair of adjacent data layers which are opposed to each other are inhibited from recording BCA information in the corresponding segments to thereby avoid overlapping of BCA record positions. This inhibition may be made stricter. For instance, the BCA information may be inhibited from being recorded in the corresponding segments between each pair of adjacent data layers or in adjacent segments between each pair of adjacent data layers. Yet alternatively, the BCA information may be recorded in a plurality of segments in each data layer, with the above inhibitions satisfied.

The BCA information recorded positions corresponding to each data layer may be managed using, for example, a correspondence table that defines the relationship between the layer number of each data layer and the segment number of each segment that stores the BCA information and is included in each data layer.

FIGS. 5 and 6 show examples of tables that each define the correspondence relationship between the layer number of each data layer and the segment numbers in each pre-format area.

FIG. 5 shows the correspondence relationship between layer numbers and segment numbers, assumed in the case where ten data layers having layer numbers 0 to 9 are provided, and each pre-format area 3 of each data layer has five segments having segment numbers 1 to 5. In the assignment example of FIG. 5, segment numbers are designated so that the segments of adjacent layers, in which BCA marks (information) are recorded, will be separate from each other. More specifically, the segment number associated with BCA information is set to increase by 2 in accordance with an increment of 1 in the layer number. In the shown example, since the number of the data layers is 10 and the number of the segments associated with the BCA information is 5, the BCA information is assigned twice to each same segment number in the different layers, and the interval between the segments having the same segment number always corresponds to five layers. Since thus, the segments, which are included in each pair of adjacent layers and store the BCA information, are sufficiently separate from each other, signal cross talk between the BCA information items is reduced (i.e., degradation of the BCA reproduction signal is suppressed), which enables reproduction of accurate information.

FIG. 6 shows the correspondence relationship between the layer number and the segment number in an example case where there are provided ten data layers having layer numbers 0 to 9, the inner peripheral pre-format area 3-1 in each data layer includes five segments having segment numbers 1 to 5, and the outer peripheral pre-format area 3-2 in each data layer includes five segments having segment numbers 1 to 5. In the table of FIG. 6, however, in order to discriminate the segments in the inner peripheral pre-format area 3-1 from those in the outer peripheral pre-format area 3-2, the segment numbers 1 to 5 are changed to segment numbers 6 to 10 in the outer peripheral pre-format area 3-2. As shown in FIG. 6, on the data layers with the layer numbers 0 to 4, BCA information is recorded only in the inner peripheral pre-format area 3-1, while on the data layers with the layer numbers 5 to 9, BCA information is recorded only in the outer peripheral pre-format area 3-2. Thus, the segments recording the BCA information do not overlap each other to thereby completely remove the influence of interference of the BCA information between the layers.

The layer numbers and the segment numbers can be assigned in various ways, as well as the ways shown in FIGS. 5 and 6. For instance, instead of the way shown in FIG. 5, segment numbers 3, 5, 2, 4 and 1 or 5, 2, 4, 1 and 3 may be assigned to layer numbers 0 to 4 (5 to 9), respectively, (namely, the segment numbers are assigned to every second clockwise segment position on the respective data layers with layer numbers 0 to 4 (5 to 9), and the assignment begins from the number other than 1). Similarly, segment numbers 1, 2, 3, 4 and 5 or 3, 4, 5, 1 and 2 may be assigned to layer numbers 0 to 4 (5 to 9), respectively, (namely, the segment numbers are assigned to every second clockwise segment position on the respective data layers with layer numbers 0 to 4 (5 to 9). Alternatively, segment numbers 1, 4, 2, 5 and 3 or 2, 5, 3, 1 and 4 may be assigned to layer numbers 0 to 4 (5 to 9), respectively, (namely, the segment numbers are assigned to every second counterclockwise segment position on the respective data layers with layer numbers 0 to 4 (5 to 9). Yet alternatively, segment numbers 1, 6, 3, 8, 5, 10, 2, 7, 4 and 9 may be assigned to layer numbers 0 to 9 (namely, the segment numbers are alternately assigned to the inner peripheral pre-format area 3-1 and the outer peripheral pre-format area 3-2).

Further, as the format of the correspondence table, various formats are usable. For instance, when both the inner peripheral pre-format area 3-1 and the outer peripheral pre-format area 3-2 are employed, an inner/outer peripheral flag indicating the inner peripheral pre-format area 3-1 or the outer peripheral pre-format area 3-2 may be additionally employed as shown in FIG. 7, instead of the correspondence table of FIG. 6. In the table of FIG. 7, inner/outer peripheral flag 0 indicates the inner peripheral pre-format area 3-1, and inner/outer peripheral flag 1 indicates the outer peripheral pre-format area 3-2.

The segment position in which the BCA information is recorded can be determined, for example, based on a segment number included in the address information of the servo layer described later.

It may be predetermined whether both the inner peripheral pre-format area 3-1 and the outer peripheral pre-format area 3-2 should be used, or whether only the inner peripheral pre-format area 3-1 or only the outer peripheral pre-format area 3-2 should be used. Further, the correspondence relationship between the layer number and the segment number may be predetermined. The correspondence table showing the predetermined table may be pre-stored in the controller of the information recording/reproducing apparatus. By virtue of this structure, reliable access to a desired one of the data layers can be realized in the information recording medium in which servo and data layers are provided separately.

(BCA Mark)

Figure 8:
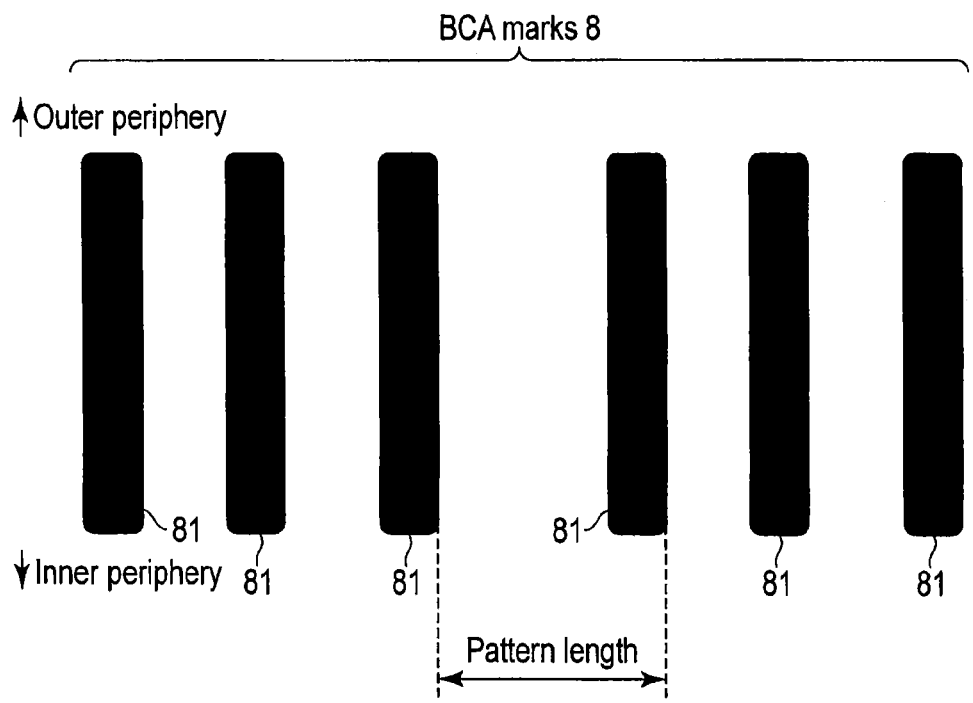
FIG. 8 is a schematic view of an example of a BCA mark.

FIG. 8 is a schematic view showing a BCA mark example.

As shown in FIG. 8, a BCA mark 8 is a pattern including a sequence of radially uniform marks 81. "Uniform" means a uniform state associated with a light spot diameter for reproducing the BCA mark. Namely, even when there is a fine change in the shape of the mark 8, it is sufficient if the change is less than the light spot and the shape is averagely uniform relative to the light spot size. The BCA pattern 8 is recorded circumferentially (in a BCA recording area of the same radial position). More specifically, management data (also called recording data) including layer numbers is circumferentially recorded, modified by a modulation scheme, such as Biphase or RZ modulation. Actually, the BCA pattern has a radially extending shape as shown in FIG. 4, which is advantageous in that it can be reproduced without tracking control.

In the case of two or more data layers (e.g., a data layer A and a data layer B), if their BCA information (corresponding to the BCA mark) is recorded in the same segment position, it is desirable that the BCA mark pattern (a mark sequence) have a pattern length (mark interval) shorter than the diameter of the light spot spread on a data layer (e.g., the data layer B) as a non-focus layer assumed when a data layer (e.g., the data layer A) serving as a focus layer has been focused. When the layer interval is sufficiently wide, the light spot diameter of the non-focus layer is determined by the NA (numerical aperture) of the objective lens of the information recording/reproducing apparatus. Accordingly, the maximum pattern length of such a BCA mark as shown in FIG. 8, i.e., the light spot diameter Rmax of the non-focus layer, can be determined by $$R\max = 2 \times TAN(ASIN(LNA/n)) \times L \quad (1)$$

where LNA is the NA of the objective lens of the information recording/reproducing apparatus, n is the refraction index of the information recording medium corresponding to the wavelength of the reproducing laser beam of the information recording/reproducing apparatus, and L is the interval between the layer with the target BCA information and another layer (non-focus layer) with BCA information positioned in the corresponding position as the target BCA information. Further, TAN is tangent function, and ASIN is arcsine function.

For instance, in the case of the optical disk shown in FIG. 5, the layer interval corresponds to five layers. Assuming that the NA of the objective lens of the information recording/reproducing apparatus is LNA=0.85, the layer interval is L=72 μm, and the refraction index of the information recording medium n=1.6, the diameter of the light spot corresponding to the layer number 5, assumed during reproduction corresponding to the layer number 0, is about 90 μm.

Accordingly, in the optical disk shown in FIG. 5, it is desirable to record a BCA mark pattern with a pattern length shorter than Rmax=90 μm.

The above structure can sufficiently suppress leakage of a signal from a BCA mark that is not reproduced.

The BCA mark can be recorded by, for example, a method of applying a high-power laser beam to a data layer to change the quality of the data layer so as to change the reflection coefficient thereof, or by a method of setting a mask on each data layer during forming said each layer to form a structure in which each data layer has different reflection coefficients. However, the embodiment is not limited to these methods.

Figure 9:
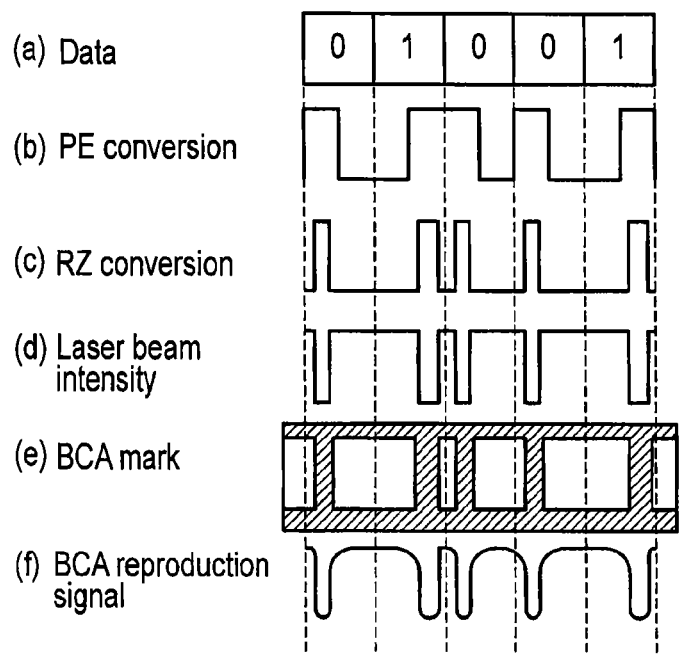
FIG. 9 is a view showing examples of BCA mark records.

FIG. 9 shows a specific example of recording a BCA mark using a high-power laser.

In FIG. 9, (a) shows an example of recording data to be stored.

In recording BCA information, the recording data to be stored is firstly subjected to the phase encoding (PE) shown in (b), and then subjected to the return-to-zero (RZ) conversion shown in (c). These steps are executed to cause the frequency of switching between the High and Low portions of the signal to be constant between different recording data items.

Subsequently, to record a BCA mark, the intensity of the laser beam is modulated as shown in (d), based on the PE- and RZ-converted signal. For instance, a laser beam of a power level that will not change the quality of the medium is applied to the portion of the PE- and RZ-converted signal corresponding to the Low level, and a laser beam of a high power level that will change the quality of the medium is applied to the portion of the PE- and RZ-converted signal corresponding to the High level.

As a result, such a BCA mark as shown in, for example, (e) is recorded in each BCA area of each data layer.

When the thus-recorded BCA mark is reproduced, such a reproduction signal as shown in, for example, (f) is obtained.

(Physical Structure of a Track)

FIG. 10 shows a physical structure example of a track formed in a servo layer of the information recording medium. In FIG. 10, (a) shows a spiral track 60 formed on a servo layer SLm. As shown in (b) of FIG. 10, the spiral track 60 is formed by forming a groove 62 in a surface 61 called "land." This groove winds due to wobble modulation, width modulation, etc. based on address management data including, for example, address information.

Figure 11:
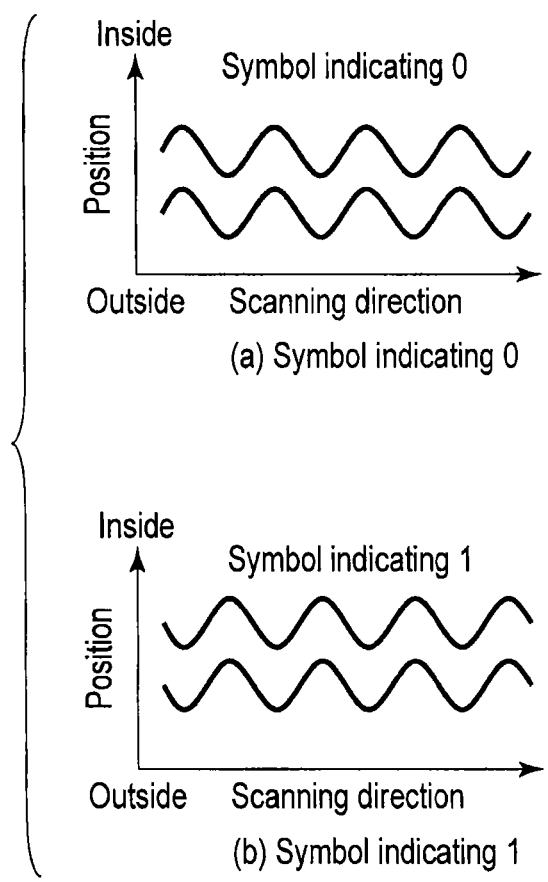
FIG. 11 is a view for explaining an example of wobble modulation.

FIG. 11 shows an example of wobble modulation. In the wobble modulation, the groove is radially modulated in the form of a sine wave of a fine amplitude. By changing the phase, symbols "1" and "0" are indicated. In the example of FIG. 11, information bit corresponding to one bit is expressed by phase modulation in which four wobble waves represent one symbol. For instance, the phase that winds radially inwardly at first as shown in (a) is assigned to information bit of "0," the phase that winds radially outwardly at first as shown in (b) is assigned to information bit of "1."

FIG. 12 shows an example of a bit assignment associated with the address management data. The address management data includes various types of information corresponding to the layout of the servo layer, and other information. In this example, the address management data is formed in units of 54 bits, and different bit assignments are employed between the land and the groove. Namely, the land incorporates 3-bit segment information, a 1-bit layer address, a 7-bit segment address, a 6-bit zone address, a 1-bit parity, 12-bit buffer, a 12-bit land track address, and 12-bit buffer. The groove incorporates 3-bit segment information, a 1-bit layer address, a 7-bit segment address, a 6-bit zone address, a 1-bit parity, 12-bit groove track address, 12-bit buffer, and 12-bit disk information. The "segment information" indicates a segment type, such as the number of segments corresponding to one circumferential zone. The "layer address" is information, such as SL0 and SL1, for discriminating the servo layers. The "segment address" indicates a physical segment number, and the "zone address" indicates a zone number. The "parity" is information for detecting an error in the segment information and each address data item. The "land track address" and the "groove track address" each indicate a track number assigned to one circuit of track. Further, part of the data is assigned to "disk information." This portion stores information, such as the management information of the information recording medium itself, which differs from the address information.

Figure 13:
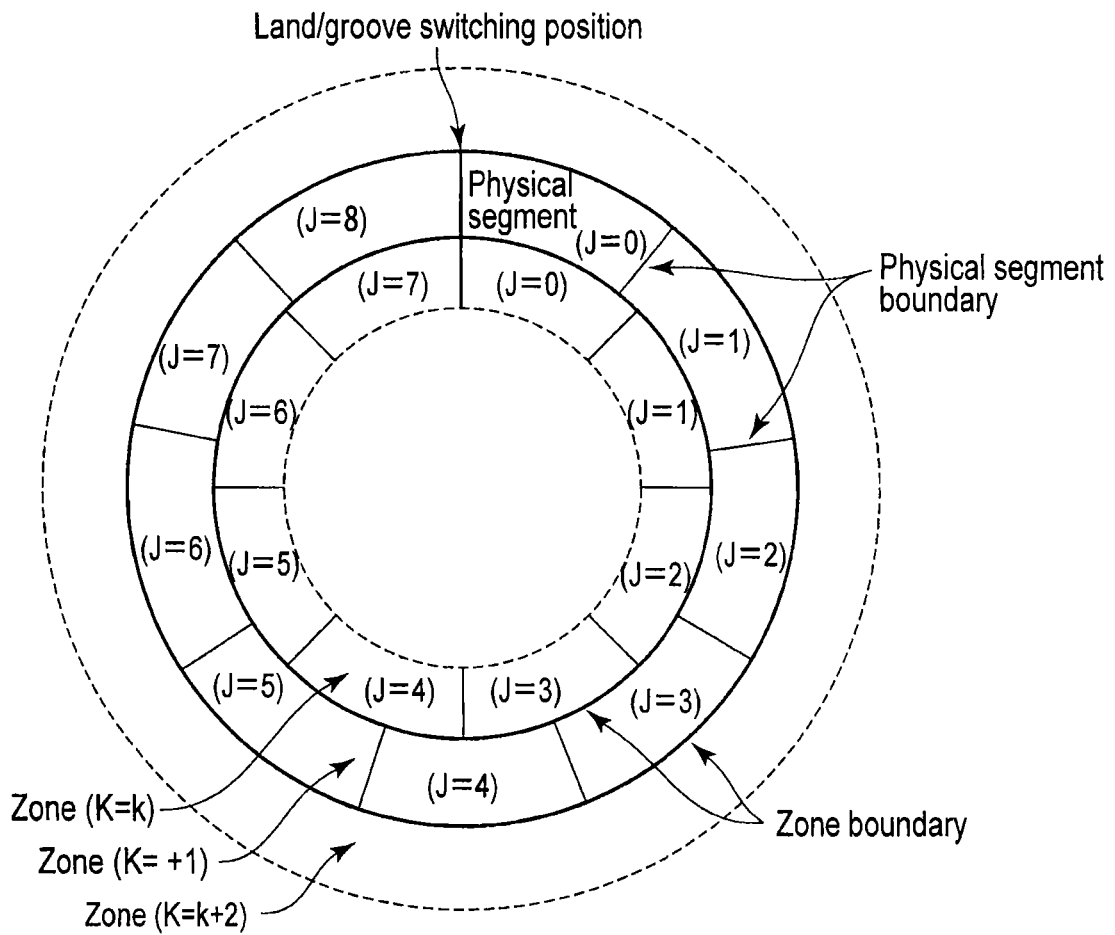
FIG. 13 is a view showing a layout example of an address area in a servo layer.

FIG. 13 shows a layout example of the addresses in the address area of the servo layer.

The address area is divided into concentric zones each including a plurality of tracks, and zone numbers (K) are assigned to the respective zones. The zone numbers are incremented in the track traveling direction. For instance, in the servo layer SL0, the zone numbers are incremented from an inner peripheral portion to an outer peripheral portion, while in the servo layer SL1, the zone numbers are incremented from an outer peripheral portion to an inner peripheral portion. Further, each track is divided into physical segments by radially extending physical segment boundaries. In the same zone, the same number of physical segments is included in each track. In a radially outer zone adjacent to a certain zone, the number of physical segments included in each track is larger by one than in the certain zone. To the respective physical segments, physical segment numbers (J) are assigned. The physical segment number is set to 0 in the position immediately after a land/groove switching position, and is incremented in the track traveling direction. Further, track numbers are assigned to the respective circuits of track. The track number of the initial track in each zone is set to 0, and the track number is incremented in the track traveling direction.

In addition, wobbles are formed so that all physical segments have wobble or width modulation of the same wave number. Thus, in each zone, the respective circuits of track have the same wave number. Accordingly, in each zone, the physical period of the wobble or width modulation is slightly longer in an outer peripheral track than in an inner peripheral track. Further, between the zones, the average physical period of the wobble or width modulation is substantially the same in outer and inner peripheral tracks.

In the information recording/reproducing apparatus, during recording and reproducing, the rotation of the disk is controlled to make constant the period of the signal for reproducing the wobbles. Namely, in each zone, rotation is performed with the angular velocity kept constant, and the angular velocity is varied between zones. As a result, control is performed with substantially constant linear velocity (CLV) in the overall disk. This scheme is called "Zoned Constant Linear Velocity (ZCLV)."

(Layout of Each Layer)

FIG. 14 shows a layout example of the servo and data layers.

Each servo layer SLm includes an inner peripheral management area m, an address area m and an outer peripheral management area m from the inner peripheral side. Each data layer DLn includes an inner peripheral pre-format area n, an information recording n and an outer peripheral pre-format area n from the inner peripheral side.

The inner and outer peripheral management information areas provided in each servo layer store management information for managing the information recording medium 1, such as the type of a medium and an optimal recording condition, using a groove or a pit sequence obtained by wobble modulation of a frequency different from that of the address area. The address area includes a groove track, and stores address information by wobble and width modulations using the groove.

In the inner and outer peripheral pre-format areas provide in each data layer, BCA information including layer number information, management information and the like is recorded before shipping of the disk by, for example, a pre-writer or a film forming device, using a radial or elliptic record mark. Before information, such as user information, is recorded, inner and outer format areas are unrecorded areas. However, at the time of information recording, the information recording apparatus performs test recording for adjusting the recording condition. Further, record management information for managing the user information recorded in the information recording area of each data layer is recorded. Before information, such as the user information, is recorded, the information recording area stores no data. At the time of information recording, the information, such as the user information, is recorded as a record mark sequence in accordance with the groove and land tracks of each servo layer.

FIG. 15 shows another layout example of the servo and data layers.

In the example of FIG. 15, assume that the scanning direction of a light spot on the servo layer SL0 is from the inner periphery to the outer periphery, and that the scanning direction of a light spot on the servo layer SL1 is from the outer periphery to the inner periphery. Further, when information is recorded to data layers with even numbers (DL0, DL2, ..., DL8), a track signal corresponding to SL0 is used as a track control signal, while when information is recorded to data layers with odd numbers (DL1, DL3, ..., DL9), a track signal corresponding to SL1 is used as the track control signal. In the information recording medium shown in FIG. 15, the BCA information of the data layers with the even numbers corresponding to SL0 are provided only in the inner peripheral pre-format area, and the BCA information of the data layers with the odd numbers corresponding to SL1 are provided only in the outer peripheral pre-format area. As a result, crosstalk between the BCA information layers can be reduced. Furthermore, when continuous recording has been performed, the light spot is moved from the inner periphery to the outer periphery on the data layers with the even numbers, and is moved from the outer periphery to the inner periphery on the data layers with the odd numbers. Therefore, reproduction of the BCA information is possible immediately before it is recorded to each layer. Moreover, although in FIG. 15, the data layers, in which recording is performed in opposite directions, are stacked alternately, this may be modified such that, for example, the rear half layers (i.e., from DL0 to DL4) are made to correspond to SL0, and the front half layers (i.e., from DL5 to DL9) are made to correspond to SL1. In this case, the BCA information in the rear data layers corresponding to SL0 are arranged in the inner peripheral pre-format area, and the BCA information in the front data layers corresponding to SL1 are arranged in the outer peripheral pre-format area.

(State of Each Layer after Information Recording)

Figure 16:
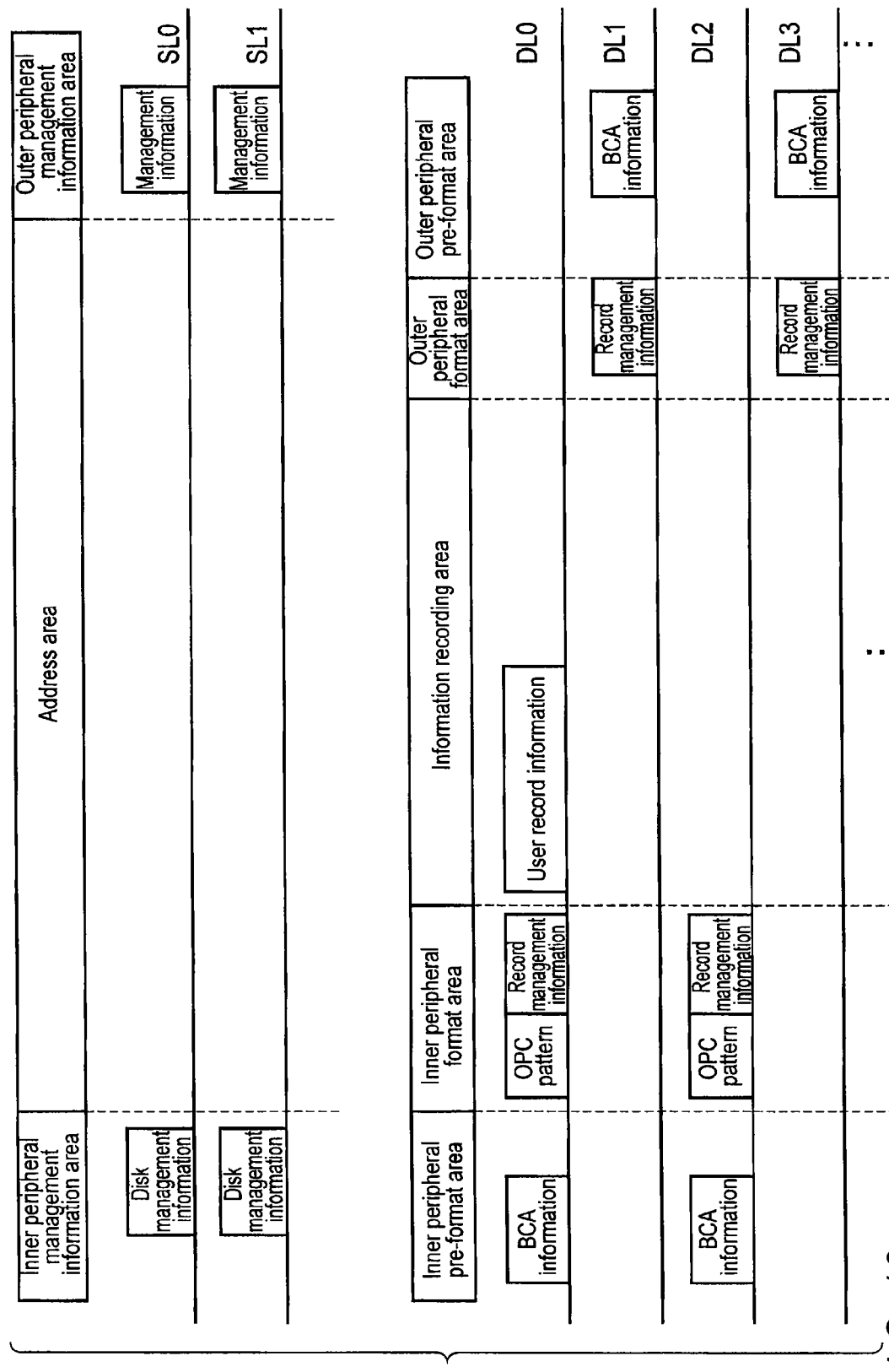
FIG. 16 is a view showing an arrangement example of various information items.

FIG. 16 shows arrangement of various types of information recorded in the information recording medium shown in FIG. 15.

As described above, the inner and outer peripheral management information areas of the servo layers SL0 and SL1 store disk management information. Further, address information is recorded in the inner and outer peripheral management information areas and address area, although it is not shown. On the data layers, BCA information is recorded in predetermined portions of the inner and outer pre-format areas. Also, OPC patterns and record management information are recorded by the information recording/reproducing apparatus in part of the inner and outer peripheral format areas. The OPC patterns are recorded and reproduced to beforehand optimize recording power, pulse width, etc., when the information recording/reproducing apparatus performs recording to the information recording medium. Although in FIG. 16, the OPC patterns are recorded only in the inner peripheral format areas, they may be recorded in the outer peripheral format areas. In addition, the record management information indicates the layer number, format, user record information recorded position, etc. of each data layer of the medium. The record management information is generated by a controller (in the case of FIG. 17, a controller 5) incorporated in the information recording/reproducing apparatus, based on the information read from the management information, BCA information, etc., or based on the recorded position of user recorded information. The user recorded information is information obtained by adding, to user input information, error correction information, buffer, etc. The disk management information, the address information and the BCA information are recorded by an information recording medium producing apparatus before shipping of the information recording medium, while the OPC pattern, the record management information and the user recorded information are recorded, when necessary, by the information recording/reproducing apparatus.

(Information Recording/Reproducing Apparatus)

Figure 17:
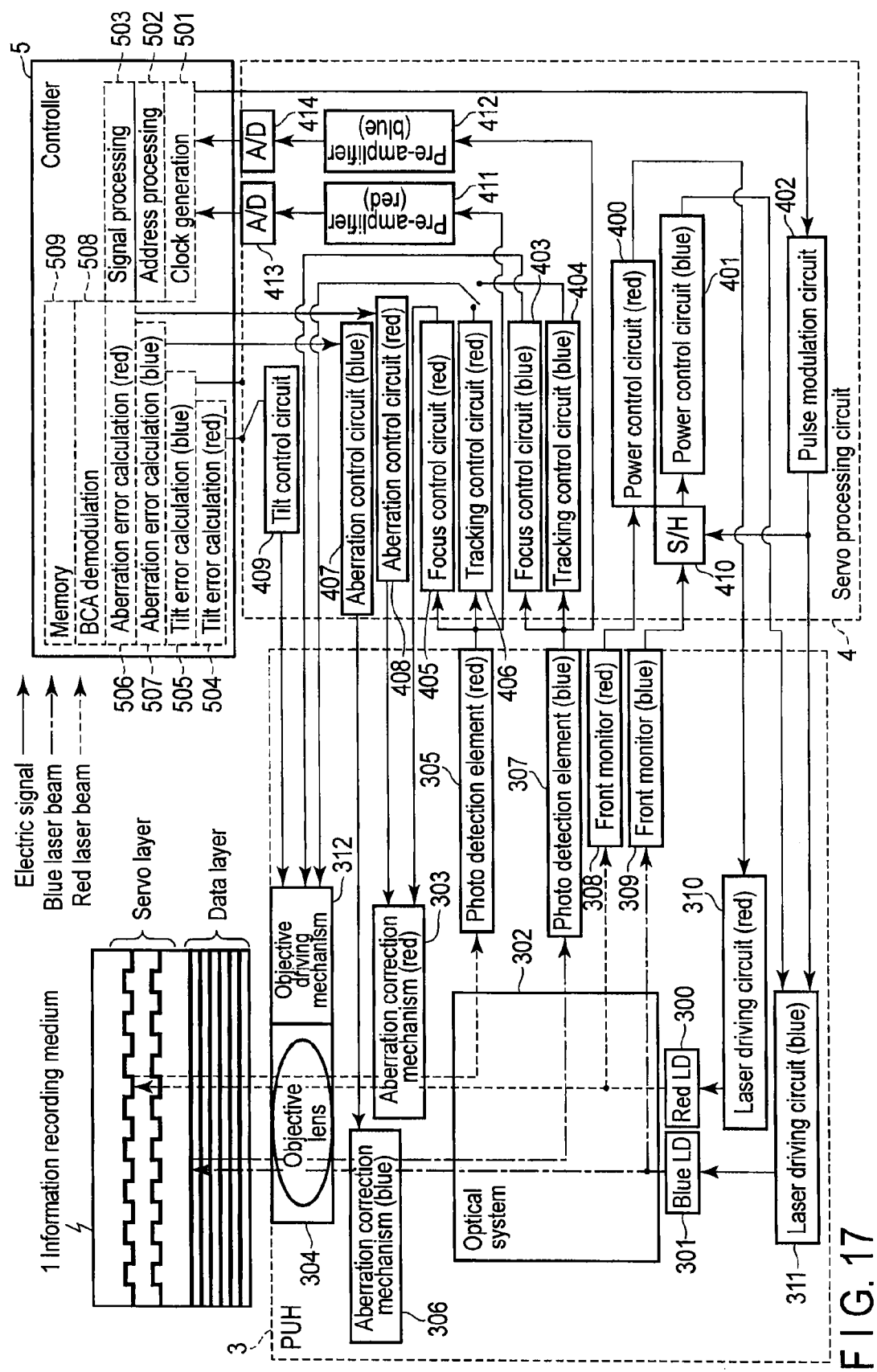
FIG. 17 is a block diagram showing a structure example of an information recording/reproducing apparatus according to the embodiment.

FIG. 17 is a block diagram showing an example of the information recording/reproducing apparatus according to the embodiment.

The information recording/reproducing apparatus incorporates a pickup head (PUH) 3, a servo processing circuit 4 for controlling various mechanisms, and a signal processing circuit 5 for performing various types of signal processing. The PUH 3 is connected to a PUH driving mechanism (not shown) and can be radially moved by the mechanism with respect to the medium. The servo processing circuit 4 is connected to the controller 5. The controller 5 performs signal processing based on an instruction from a system of a high order, thereby controlling, for example, the servo processing circuit 4. The information recording/reproducing apparatus also incorporates a mechanism (not shown) for driving the information recording medium, which rotates the information recording medium for recording and reproducing information.

(Structure of Information Recording/Reproducing Apparatus and its Operation During Recording) (PUH)

The PUH 3 incorporates a laser diode (red LD) 300 as a light source configured to emit a red laser beam having a wavelength of 650 nm and serving as a servo laser beam, and a laser diode (blue LD) 301 as a light source configured to emit a blue laser beam having a wavelength of 405 nm and serving as an information recording/reproducing laser beam. The PUH 3 can simultaneously emit the two laser beams to record/reproduce data. The red laser beam is separated into front monitor light beam and medium radiation light beam after entering an optical system 302. The medium radiation light beam is collected onto a servo layer of the information recording medium 1 via a red aberration correction mechanism 303 and an objective lens 304. The light returned from the servo layer is guided to the optical system 302 through the same route as before. This light beam is then guided to a (red) photo detection element 305, where it is converted into an electric signal. Similarly, the blue laser beam is also separated into front monitor light beam and medium radiation light beam after entering an optical system 302. The medium radiation light beam is collected onto a data layer in the information recording medium 1 via a blue aberration correction mechanism 306, and the objective lens 304. The light beam from the data layer is returned to the optical system 302 through the same route and then guided to a (blue) photo detection element 307, where it is converted into an electric signal. The objective lens 304 is driven in a focusing direction and a tracking direction by an objective driving mechanism 312, and is controlled in its tilt state by a tilt control mechanism 409. The (red- and blue-beam) aberration correction mechanism 303 and 306 impart various aberrations, such as spherical aberration, astigmatism and coma aberration, to the laser beams passing therethrough, thereby controlling the wave aberration of the beams. The beams (red and blue) for front monitors are received by front monitors (for red and blue beams) 308 and 309, where they are converted into electronic signals.

(Servo Processing Circuit)

The servo processing circuit 4 generates various control signals based on the electronic signals output from the PUH 3, to control the PUH 3. The electronic signals output from the red and blue front monitors 308 and 309 are input to power control circuits (for red and blue beams) 400 and 401 via a sample hold (S/H) circuit 410. The power control circuits 400 and 401 control the laser driving circuits 310 and 311, respectively, to adjust the signals to desired values. Further, at the time of recording information, a pulse modulation circuit 402 controls the laser driving circuit 311 based on a clock signal and a recording data signal from the signal processing circuit 5, thereby modulating the intensity of the blue laser beam in a pulsed shape. For instance, if the recording data signal indicates "1," the intensity of the corresponding portion of the laser beam is increased. Similarly, the intensity of the portion of the laser beam corresponding to "0" is reduced.

The output signal of the (blue) photo detection element 307 is input to a blue focus control circuit 403 and a blue tracking control circuit 404. The blue focus control circuit 403 executes calculation based on a method, such as a knife-edge method or an astigmatic method, thereby generating a focus error signal. Based on the generated signal, the focus control circuit 403 controls the objective driving mechanism 312 to converge the blue laser beam on a desired data layer. When reproducing the data recorded on the data layer, the tracking control circuit 404 executes a calculation based on a method, such as Differential push-pull (DPD), thereby generating a tracking error signal. Further, based on the generated signal, the tracking control circuit 404 controls the objective driving mechanism 312 and the PUH driving mechanism to make the light spot of the blue laser follow a desired track.

The output signal of the red photo detection element 305 is input to a red focus control circuit 405 and a red tracking control circuit 406. The red focus control circuit 405 executes a calculation based on the knife-edge method or the astigmatic method, thereby generating a focus error signal, and controls the red aberration correction mechanism 303 using the generated signal, thereby converging the light spot of the red laser on a desired servo layer. When recording data to the data layer, the tracking control circuit 406 executes a calculation based on a scheme, such as a push-pull method, thereby generating a tracking error signal. Further, the tracking control circuit 406 controls the objective driving mechanism 312 and the PUH driving mechanism to make the light spot of the red laser follow a desired track. At this time, the radial position of the light spot of the blue laser is controlled in the same way as that of the light spot of the red laser.

(Controller)

The output signals of the (red and blue) photo detection elements 305 and 306 are sent to A/D converter circuits 413 and 414 via (red and blue) pre-amplifiers 411 and 412 of the servo processing circuit 4, respectively, where they are A/D converted. The converted signals are input to the controller 5. The controller 5 incorporates a clock generation block 501 configured to generate a clock signal from the input signal, an address processing block 502 configured to read address data, a signal processing block 503 configured to, for example, read recorded data and convert writing data, a BCA information demodulation block 508 configured to read BCA information, aberration error calculation blocks 506 and 507, tilt error calculation blocks 504 and 505, etc. Thus, the respective functions are installed in the form of software, such as firmware, or electronic circuits. When reading recorded data, various types of filtering, PRML, demodulation and error correction processing are executed. When performing conversion of writing data, modulation, such as 17 modulation, error correction using a Reed-Solomon code or a low-density parity-check code (LDPC), and data ID insertion, etc., are executed. When reading the BCA information, various types of filtering, demodulation using PE and RZ modulation signals, error correction, etc., are executed. The values obtained in the respective blocks are used as the control signals of the servo processing circuit 4, and the read address information and recording data, for example, are sent to an upper-order system (not shown).

Signal reproduction of the BCA information on the data layer is performed using a blue laser beam. Further, when reproducing the BCA information, the information recording/reproducing apparatus reads the address information of the servo layer, using a red laser beam, thereby acquiring radial position data associated with the BCA information. Yet further, the information recording/reproducing apparatus has a function of acquiring the position data of BCA information in each pre-format area, based on the segment number included in the address information, thereby accurately reading information from the BCA information recording area. At this time, the segment numbers assigned to the BCA information storing segments in each layer are read from such table information as shown in FIG. 5, which is beforehand stored in a memory block 509 included in the controller 5, or from BCA information arrangement information as table information included in the management information area of the servo layer, or in the disk management information included in the disk information in the address management data.

(Reproduction of BCA Information)

Figure 18:
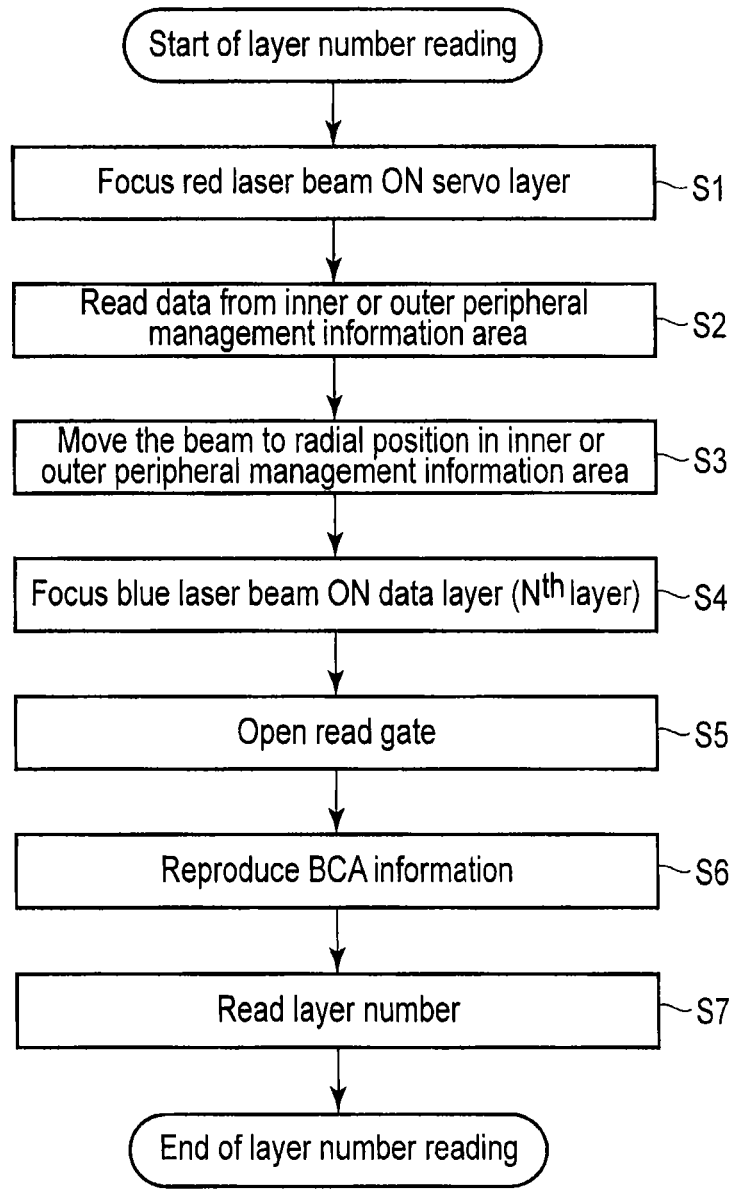
FIG. 18 is a flowchart showing an example of processing of reading a layer number.

FIG. 18 is a flowchart for explaining a process of reading a layer number which is performed by the information recording/reproducing apparatus of the embodiment.

The procedure of FIG. 18 can be achieved even by such an apparatus as shown in FIG. 17, which is obtained by eliminating the information recording function from the information recording/reproducing apparatus. An apparatus having an information reproducing function will herein be referred to collectively as "the information reproducing apparatus," regardless of whether it has a function of recording information.

When reading the layer number, the information recording/reproducing apparatus (information reproducing apparatus) focuses the light spot of the red laser on the servo layer (step S1).

Subsequently, the apparatus reads management information from the inner or outer peripheral management information area of the servo layer, using a red laser beam (step S2). The disk management information includes data indicating the type of the disk format. The information recording/reproducing apparatus (information reproducing apparatus) refers to the memory block 509 of the controller 5, which stores arrangement information (e.g., the radius at which BCA information is recorded in each data layer, flag information indicating the inner or outer pre-format area, the segment number, the track address of the corresponding servo layer, etc.) associated with the BCA information, thereby specifying the BCA information recorded position on the data layer that is intended to be accessed, in accordance with the read disk format. Alternatively, the BCA information recorded position may be specified by reading BCA information arrangement information from the management information.

Using the information acquired in step S2, the apparatus moves the PUH 3 to the BCA information recorded radial position or track address on a desired data layer (step S3).

After that, the light spot of the blue laser is focused on the desired data layer (set as the $N^{th}$ layer) (step S4). At this time, tracking control is performed in accordance with the track on the servo layer, and the controller 5 reads information, such as the track address, the segment number, etc., from the servo layer.

Thereafter, the controller 5 generates a read gate using the information specified in step S2, the track address currently read and the appearance timing of, for example, the segment number, and opens the read gate at the BCA information position of the desired data layer (step S5).

After that, the controller 5 fetches BCA information from the read signal of the blue laser system, and reproduces the information in the BCA demodulation block 508 (step S6).

The read BCA information is demodulated to read layer number information therefrom (step S7).

That is the termination of the layer number reading.

As described above, when reading (reproducing) BCA information, the position of the segment storing BCA information can be specified from the address assigned to the servo layer, which enhances accessibility to BCA information area. Further, immediately after focus control, the layer number of the focused layer can be recognized and confirmed.

(Formatting Method)

In the information recording method of the embodiment, before recording user data to an optical disk, the disk is formatted. By this formatting, record management information including the layer number is recorded on each data layer of the optical disk, using standard recording marks.

Figure 19:
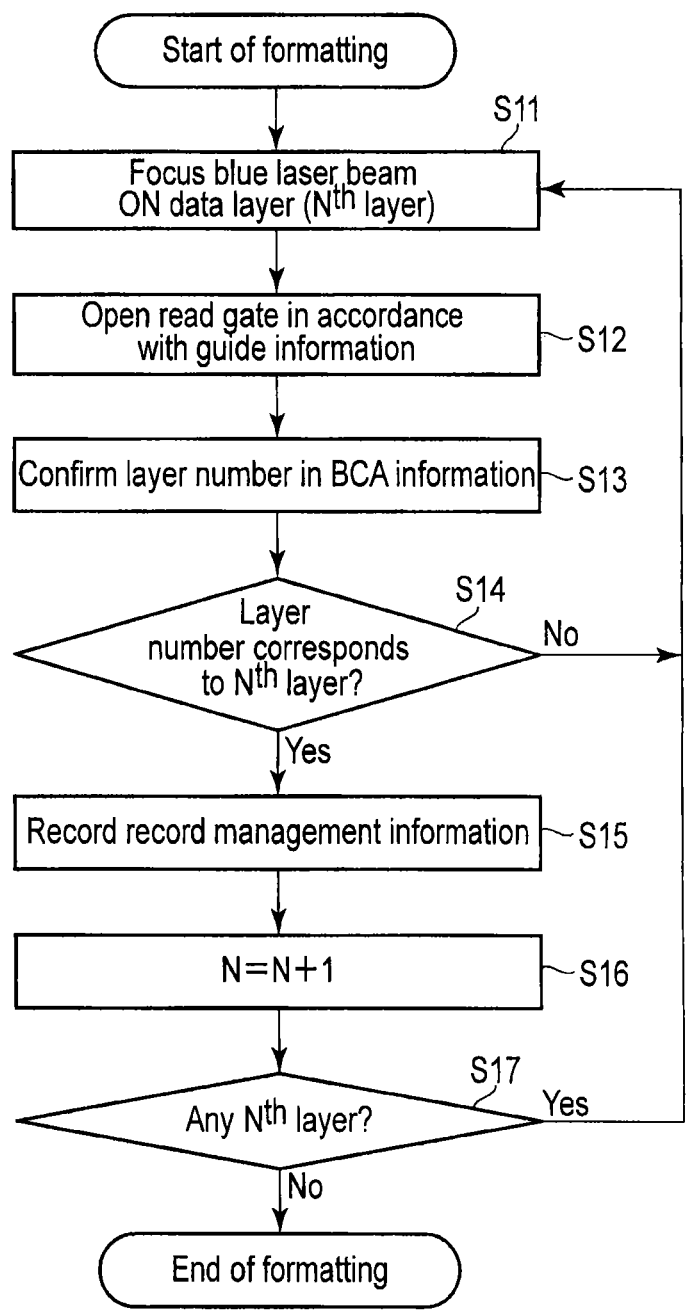
FIG. 19 is a flowchart showing an example of disk formatting processing.

FIG. 19 shows disk formatting processing.

After starting formatting, the information recording/reproducing apparatus focuses a blue laser beam on a desired data layer (set as the $N^{th}$ layer) (step S11). At the start of formatting, N is set to 0.

Subsequently, in synchronism with the address information of the servo layer, the read gate of the BCA demodulation block 508 is opened to read BCA information (step S12).

After that, the BCA signal is demodulated to read the layer number from the BCA information (step S13).

Thereafter, it is determined whether the read layer number is identical to a layer number N as a target (step S14). If they are identical, the program proceeds to step S15. In contrast, if they are not identical, the program returns to step S11 to repeat the processing, since the focusing control may have failed.

In step S15, the blue laser beam is moved to the recording area, and record management information including the layer number is recorded on the data layer using the same method as the modulation method of recording user data.

Subsequently, the layer number of the data layer as a format target is stepped up by one (step S16).

Thereafter, based on the disk information recorded in the servo layer, it is determined whether a target layer exists in the disk (step S17). If the target layer exists, the program proceeds to step S11, where formatting for the target layer is performed. If there is no target layer, formatting is finished.

By recording record management information including a layer number on each data layer, utilizing the above-mentioned format and the same modulation method as that for recording user data, quick and accurate reading of the layer number can be realized in a layer switching operation during recording the user data, since the record management information is read instead of BCA information.

(Content of Information)

FIG. 20 shows an example of a BCA information content list. FIG. 21 shows a content list of disk management information stored in the inner or outer peripheral management information area or in the disk information. These information items are all those recorded in an information recording medium by a medium manufacturing maker before shipping the information recording medium.

In the BCA information content list of FIG. 20, each data item indicates the information associated with the layer that stores said each data item. Accordingly, even when, for example, a medium itself is of a hybrid type in which a plurality of format layers are provided, the type of format in the BCA information indicates the format type of each layer, e.g., a code for discriminating the format type, such as a one-time recording type, a repetitive recording type or a reading-only type. In FIG. 20, the layer number indicates the number assigned to the layer storing the BCA information. The format may also hold, for example, a segment number corresponding to the area storing the BCA information, or a track address corresponding to the segment number, and information indicating whether the area is an inner or outer peripheral pre-format area. The information area arrangement information includes address information indicating the start and end positions of the inner and outer peripheral format areas in each data layer, and address information indicating the start and end positions of the information recording area that stores user record information. The reproducing power information, recording power information and recording pulse width information indicate codes that represent optimal reproducing power, recording power and recording pulse shape corresponding to, for example, an optimal recording rate for the layer with the BCA information. Since thus, the servo layer stores information associated with the reproducing power of each data layer, the information recording apparatus can reproduce the servo layer with only the laser for servo layer reproduction kept in the ON state, and can turn on the laser for data layer reproduction with an optimal power, after confirming an optimal reproduction power for the data layers. This structure can avoid, for example, such a problem that a data recording/reproducing layer is reproduced with a high power to thereby unintentionally damage the data previously recorded in the data recording/reproducing layer.

FIG. 21 shows a list associated with disk management information content. In this figure, the format type indicates a code for discriminating the format type of the information recording medium, e.g., a one-time recording type, a repetitive recording type or a reading-only type. If the information recording medium is of a hybrid type in which a plurality of layers employed therein have different formats, the format type indicates which format is imparted to each layer. The disk size is information indicating the diameter, capacity, etc., of a disk, and the transfer rate is information associated with an information transfer rate, such as a recordable rate or a reproducible rate. The disk structure and the recording density are information items indicating the number of servo layers and the number of data layers in the information recording medium, the direction of spiral, the size of a recording mark, a track interval, etc. The BCA information arrangement information indicates the radius in each recording layer at which BCA information is arranged, and the positions in which BCA information items, such as a corresponding track address and segment number, are arranged. The information area arrangement information indicates address information corresponding to the start and end positions of the inner and outer peripheral format areas in each data layer, and address information indicating the start and end positions of the information recording area that stores user record information. The cryptographic key information indicates a cryptographic key used for encrypting the user record information. The reproducing power information, the recording power information and the recording pulse width information indicate a reproducing power, a recording power and a recording pulse width optimal to the information recording medium.

As described above, the management information includes BCA information arrangement information. By virtue of this structure, the information reproducing apparatus can accurately access the BCA information by firstly reading the same from the servo layer.

FIG. 22 shows a list associated with the content of the record management information recorded by the information recording/reproducing apparatus in the inner or outer peripheral format region in each data layer.

In FIG. 22, the recording format type is information indicating the type of the format of the information recording medium recorded in the management information, the type of the format of each data layer recorded in the record management information, and the recording mode, such as a continuous recording mode or a random recording mode, which was used for recording by the information recording/reproducing apparatus. The layer number is information that is a copy of the layer number included in the BCA information. The user record information recorded position information indicates in which position in the information area the information recording/reproducing apparatus recorded the user record information. The drive information indicates, for example, the model number of the information recording/reproducing apparatus. The learned recording power information and recording pulse width information indicate copies of the reproducing power information, recording power information and recording pulse information included in the management information, and also indicate the recording power information and recording pulse information optimized after record learning using, for example, an OPC pattern. The defect management information indicates a history of changes in the recorded position of the user record information made in accordance with the position of a defect in the information recording medium and/or detection of the defect, namely, indicates replacement addresses, replacement methods, etc.

Although a certain embodiment has been described above, it is merely an example and does not limit the scope of the invention. Various omissions, various replacements and/or various changes may be made in the embodiment. The embodiment and their modifications are included in the scope of the invention, namely, in the inventions recited in the claims and equivalents thereof.

What is claimed is:

1. An information recording medium for optically storing data, which has a radial direction, comprising:
a plurality of stacked data layers having layer numbers for identifying the data layers, each of the data layers having pre-format areas which are circumferentially divided into a plurality of segments having segment numbers for identifying the segments, the segments on one of the data layers being opposed to the segments on an adjacent one of the data layers, and the opposed segments having the same segment number,
wherein management information including the layer number is recorded as a sequence of marks in at least one of the segments in each of the data layers, the marks are uniformly extended in a radial direction of the recording medium, and the sequences of marks on the adjacent ones of the data layers are separately allocated to the segments having the different segment numbers, which are not opposed to each other on the adjacent ones of the data layers; and
at least one servo layer storing the layer numbers and the segment numbers relating to the layer numbers, the combination of the layer number and the corresponding segment number specifying the segment on which the sequence of marks are allocated.

2. The information recording medium of claim 1, wherein the pre-format area is provided in one of an inner peripheral portion and an outer peripheral portion of each of the data layers.

3. The information recording medium of claim 2, wherein the management information is recorded in one of the segments in the one data layer.

4. The information recording medium of claim 1, wherein the pre-format area is provided in both of an inner peripheral portion and an outer peripheral portion of each of the data layers.

5. The information recording medium of claim 4, wherein the sequences of marks is recorded in one of the segments in one of the inner peripheral pre-format area and the outer peripheral pre-format area in the one data layer.

6. The information recording medium of claim 1, wherein when the sequences of marks are recorded in the segments having the same segment number so as to be arranged in of a same arrangement position on different data layers, an interval between adjacent ones the sequences of marks is set shorter than a diameter of a light spot on a data layer as a non-focus layer.

7. An information reproducing apparatus for optically reproducing data recorded in an information recording medium having a radial direction, the information recording medium comprising:
a plurality of stacked data layers having sector numbers for identifying the data layers, each of the data layers having pre-format areas which are circumferentially divided into a plurality of segments having segment numbers for identifying the segments, the segments on one of the data layers being opposed to the segments on an adjacent one of the data layers, and the opposed segments having the same segment number,
wherein management information including the layer number is recorded as a sequence of marks in at least one of the segments in each of the data layers, the marks are uniformly extended in a radial direction of the recording medium, and the sequences of marks on the adjacent ones of the data layers are separately allocated to the segments having the different segment numbers, which are not opposed to each other on the adjacent ones of the data layers; and
at least one servo layer storing the layer numbers and the segment numbers relating to the layer numbers, the combination of the layer number and the corresponding segment number specifying the segment on which the sequence of marks are allocated,
the information reproducing apparatus comprising:
a controller configured to generate timing information for reproducing the management information from the sequence of marks recorded in the segment, based on the layer numbers and the segment numbers recorded in the servo layer.

8. A management information reproducing method for use in an information reproducing apparatus configured to optically reproduce data recorded in an information recording medium having a radial direction, the information recording medium comprising:
a plurality of stacked data layers having layer numbers for identifying the data layers, each of the data layers having pre-format areas which are circumferentially divided into a plurality of segments having segment numbers for identifying the segments, the segments on one of the data layers being opposed to the segments on an adjacent one of the data layers, and the opposed segments having the same segment number,
wherein management information including the layer number is recorded as a sequence of marks in at least one of the segments in each of the data layers, the marks are uniformly extended in a radial direction of the recording medium, and the sequences of marks on the adjacent ones of the data layers are separately allocated to the segments having the different segment numbers, which are not opposed to each other on the adjacent ones of the data layers; and
at least one servo layer storing the layer numbers and the segment numbers relating to the layer numbers, the combination of the layer number and the corresponding segment number specifying the segment on which the sequence of marks are allocated,
the method comprising:
reproducing the segment numbers recorded in the servo layer; and
generating timing information for reproducing the management information from the sequence of marks recorded in the segment, based on the layer numbers and the segment numbers recorded in the servo layer.

9. An information recording/reproducing apparatus for optically reproducing data recorded in an information recording medium having a radial direction, the information recording medium comprising:
a plurality of stacked data layers having layer numbers for identifying the data layers, each of the data layers having pre-format areas which are circumferentially divided into a plurality of segments having segment numbers for identifying the segments, the segments on one of the data layers being opposed to the segments on an adjacent one of the data layers, and the opposed segments having the same segment number,
wherein management information including the layer number is recorded as a sequence of marks in at least one of the segments in each of the data layers, the marks are uniformly extended in a radial direction of the recording medium, and the sequences of marks on the adjacent ones of the data layers are separately allocated to the segments having the different segment numbers, which are not opposed to each other on the adjacent ones of the data layers; and at least one servo layer storing the layer numbers and the segment numbers relating to the layer numbers, the combination of the layer number and the corresponding segment number specifying the segment on which the sequence of marks are allocated, the information recording/reproducing apparatus comprising:

a controller configured to determine whether the management information which is pre-recorded in the segment is a desired management information to be accessed, wherein when determining that the management information is the desired management information, the controller records the desired management information in a predetermined area on a desired data layer of the data layers by a same modulation method as a modulation method of recording user data.

10. A management information recording method for use in an information recording/reproducing apparatus configured to optically record/reproduce data in an information recording medium having a radial direction, the information recording medium comprising:

a plurality of stacked data layers having layer numbers for identifying the data layers, each of the data layers having pre-format areas which are circumferentially divided into a plurality of segments having segment numbers for identifying the segments, the segments on one of the data layers being opposed to the segments on adjacent one of the data layers, and the opposed segments having the same segment number, wherein management information including the layer number is recorded as a sequence of marks in at least one of the segments in each of the data layers, the marks are uniformly extended in a radial direction of the recording medium, and the sequences of marks on the adjacent ones of the data layers are separately allocated to the segments having the different segment numbers, which are not opposed to each other on the adjacent ones of the data layers; and at least one servo layer storing the layer numbers and the segment numbers relating to the layer numbers, the combination of the layer number and the corresponding segment number specifying the segment on which the sequence of marks are allocated, the management information recording method comprising:

determining whether the management information which is pre-recorded in the segment in the pre-format area associated with a desired one of the data layers is a desired management information to be accessed, wherein when determining that the management information is the desired management information to be accessed, recording the desired management information in a predetermined area on the desired data layer by a same modulation method as a modulation method of recording user data.

11. The information recording medium of claim 1, wherein the data layer has a first characteristic that the management information is retrieved from the data layers with utilizing a first beam having a first wavelength and the servo layer has a second characteristic that the layer numbers and the segment numbers are retrieved from the servo layers with utilizing a second beam having a second wavelength different from the first wavelength.

12. The information recording medium of claim 1, wherein the servo layer has a land-groove structure in which a continuous groove is formed between continuous lands, the layer numbers and the segment numbers are recorded on the groove and are also recorded on the land so that the layer numbers and the segment numbers are retrieved from the groove or the land.

* * * * *